(12) United States Patent
Allard et al.

(10) Patent No.: US 12,343,631 B1
(45) Date of Patent: Jul. 1, 2025

(54) SECURING A MULTIPLAYER DETERMINISTIC SIMULATION USING A PARTIAL SIMULATION

(71) Applicant: Amazon Technologies, Inc., Seattle, WA (US)

(72) Inventors: Eric Allard, St-Andre d'Argenteuil (CA); Karim Osman, Montreal (CA); Bram Roger Vermeulen, Montreal (CA)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 18/215,709

(22) Filed: Jun. 28, 2023

(51) Int. Cl.
*A63F 13/57* (2014.01)
*A63F 13/70* (2014.01)
*A63F 13/355* (2014.01)
*A63F 13/77* (2014.01)

(52) U.S. Cl.
CPC .............. *A63F 13/57* (2014.09); *A63F 13/70* (2014.09); *A63F 13/355* (2014.09); *A63F 13/77* (2014.09)

(58) Field of Classification Search
CPC ........ A63F 13/57; A63F 13/70; A63F 13/355; A63F 13/77
USPC .......................................................... 463/31
See application file for complete search history.

(56) References Cited

U.S. PATENT DOCUMENTS

| 11,219,831 | B2 | 1/2022 | Dura et al. | |
| 11,928,047 | B2* | 3/2024 | Karri | G06N 20/20 |
| 2006/0080656 | A1* | 4/2006 | Cain | G06F 8/65 |
| | | | | 434/118 |

* cited by examiner

*Primary Examiner* — Allen Chan
(74) *Attorney, Agent, or Firm* — Kilpatrick Townsend & Stockton LLP

(57) ABSTRACT

Network simulation systems and methods to execute and manage simulations or games are disclosed. The simulations or games are managed so that participants of each team are prevented from having access to information which they are not expected or supposed to have in the context of a fair simulation or game. To do this, a server, in addition to running a complete simulation, runs partial simulations for each particular team based only on information available to each particular team, where the partial simulations match the simulations done locally by clients. The server also generates and transmits correction patches to the clients, and the clients use the correction patches to modify their partial simulations to incorporate information from the complete simulation which is allowed to be accessed by the client.

20 Claims, 8 Drawing Sheets

SECURING A MULTIPLAYER DETERMINISTIC SIMULATION USING A PARTIAL SIMULATION

BACKGROUND

Online games can use a variety of network models, but games with lots of units often use a deterministic lockstep network model, which allows for non-player characters (NPCs) and networked objects to simulate identically across all machines, and which reduces communication traffic to just the inputs of players. Since each player/machine needs to have all information to be able to simulate identically, games using deterministic lockstep suffer from information leaking. The leaked information can give a cheating player an unfair advantage. For example, hacking the map by inspecting the leaked information may give the cheater vision over an entire map, including enemy positions.

BRIEF DESCRIPTION OF THE DRAWINGS

Various embodiments in accordance with the present disclosure will be described with reference to the drawings, in which.

DETAILED DESCRIPTION

Figure 1:
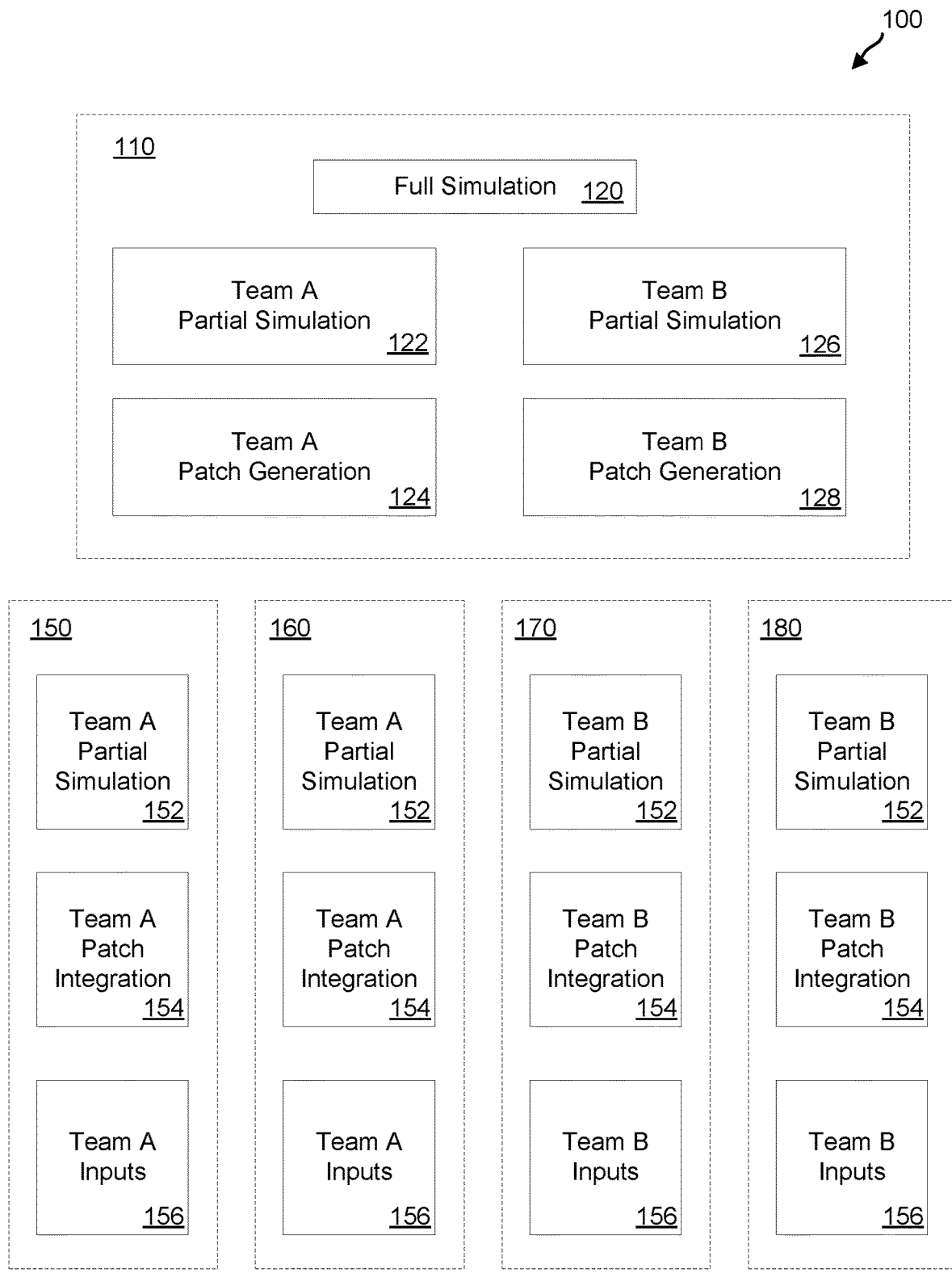
FIG. 1 is a schematic system diagram of a network simulation system according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various aspects of the embodiments discussed herein reduce or eliminate the opportunity for cheating players to unfairly take advantage of information stored locally which should not be revealed to the player.

In some embodiments, a server may be considered an independent party. The server may run a deterministic simulation with all information. For each unique perspective of the game, the server may also run a partial simulation, which, for example, is limited to using the information each unique perspective is supposed to have access to. Therefore, each partial simulation may be limited to only the information that is actively accessible to the perspective corresponding with the partial simulation.

The full simulation on the server may be filtered for each perspective, and the filtered simulation may be compared with its corresponding partial simulation. The difference between the filtered simulation and the corresponding partial simulation may be used to generate a correction patch for each client. The correction patches are sent to the clients so the clients can update their own partial simulations to keep in sync with the server. This allows a player, for example, to have their simulation affected by the actions of game entities which are not included in the information accessible to the player's client, without revealing information about the game entities or allowing the simulation to diverge.

In some embodiments, the communication traffic includes or is limited to:
1. The commands/player inputs, and
2. Corrections where the client partial simulation has diverged.

The system is particularly effective, for example, in team-based games like multiplayer online battle arena MOBA games, where players share vision between teammates. In some embodiments, a server runs three simulations for a competition with two teams. In some embodiments, a server runs two simulations for a competition with one team.

In some embodiments, each client runs a partial simulation based on information they have access to. In some embodiments, all clients on the same team run the same simulation or run simulations based on the same information. In some embodiments, all clients on the same team have access to the same information.

In some embodiments, for a two-team simulation, the server runs three simulations: a full simulation and a partial simulation for each team. The partial team simulations running on the server are the same simulation or are duplicate simulations as the simulations run by the clients on each team.

Since the clients' and the server's partial team simulations don't have all information of the full simulation, they will end up simulating to a state that diverges from the server's full simulation. For example, a simulated entity not represented in the clients' and the server's partial team simulations which influence an entity which is in or should be in the clients' and the server's partial team simulations. For example, a structure not represented in the clients' and the server's partial team simulations which influence characters which are in or should be in the clients' and the server's partial team simulations. For example, a new NPC (non-player character) walking into a team's visibility will need to be patched in to keep the client simulations in sync with the full simulation of the server. Another example is an NPC being influenced by a player character in the full simulation where that player character is not included in the information used for the partial simulation. Therefore, the NPC's behavior in the partial simulations will differ from that determined in the full simulation. The server uses its team partial simulations to determine how they differ from the full simulation and generates correction patches based on the differences. The correction patches are then applied to the team partial simulations to get them to sync up with the full simulation. The correction patches are also sent to the clients so that they can sync up with the server's partial team simulations. In some embodiments, in order to limit the size of the correction patches, net or network relevancy concepts may be applied to what differences to include in the correction patches. We can prioritize certain game entities over others. For example, player character, things happening close to player characters, or groups of player characters, may have higher priority over other entities, such as NPC's.

The end result is that clients simulate incorrectly, compared to the full simulation, and use correction patches to correct the divergences.

Correction patches can be sent to clients using, for example, reliable or unreliable remote procedure calls (RPCs). In some embodiments, the correction patches are sent using other data transfer techniques. In some embodiments, instead of sending all clients the same correction patch, the server calculates a correction patch for each client using each client's last acknowledged frame. This has the potential to increase the correction patch size over time until the client finally acknowledges a frame. Once a client acknowledges the reception of a correction patch from the server, the server sends correction patches based on the newly acknowledged frame.

In some embodiments, both the server and the client keep copies of different frames of the simulation in memory until they are no longer needed. For example, when a client acknowledges the reception of a correction patch on frame X and applies it, even though it moves on to simulate frame X+1, it must still keep a copy of frame X as it could receive more correction patches from the server for frame X. Once the server sends correction patches for frame X+1 (or higher) the client may discard frame X.

The description herein uses an example of a simulation or game having two teams. It will be understood that the principles discussed may be adapted and applied to simulations or games having one team or having three or more teams, as understood by those of skill in the art.

In some embodiments, principles discussed herein are unconditionally applied to teams and participants of a simulation or game. In some embodiments, principles discussed herein are applied to a particular participant of a simulation or game, in response to an indication that the particular participant has unfairly accessed data to give the particular participant an unfair advantage, in the context of the simulation or game. In some embodiments, principles discussed herein are applied to a particular team of a simulation or game, in response to an indication that at least one participant of the particular team has unfairly accessed data to give the at least one participant an unfair advantage, in the context of the simulation or game.

In some embodiments, benefits of the principles discussed herein include that the simulations or games using the principles are deterministic, each particular participant receives only information which the particular participant is allowed to observe or access in the context of a fair game, and data transmission is minimized because team simulation correction information is transmitted as opposed to team simulation data.

FIG. 1 is schematic system diagram of a network simulation system 100 according to some embodiments. The network simulation system 100 includes a server 110 and clients 150, 160, 170, and 180. The network simulation system 100 is configured to execute processor executable instructions which cause network simulation system 100 to perform a simulation, such as a game simulation, using methods having features and aspects similar or identical to those discussed herein. In the illustrated embodiment, network simulation system 100 is configured to perform a simulation having two groups of participants: team A and team B. In alternative embodiments, different numbers of groups of participants are used. In the illustrated embodiment, network simulation system 100 is configured to perform simulation where each group of participants has two participants. In alternative embodiments, different numbers of participants for each group are used. In the illustrated embodiment, both of the two groups of participants have the same number of participants. In alternative embodiments, a first group of participants may have a first number of participants and a second group of participants may have a second number of participants, where the first and second numbers are different.

Server 110 includes a full simulation element 120, a team A partial simulation estimation element 122, a team A patch generation element 124, a team B partial simulation estimation element 126, and a team B patch generation element 128. Each of the elements 122, 124, 126, and 128, and each of the other elements discussed herein may be or include one or more of a component, a part, a section, a portion, a constituent, and a module configured to perform the functions of the element.

Full simulation element 120 includes or uses a processing system configured to access memory containing data representing a simulation or game state and containing data representing instructions for the processing system to perform a simulation by changing or controlling the state of the simulation or game. For example, the processing system may be configured to receive inputs representing actions of participants, and to calculate or simulate consequences of those actions on the simulation or game state.

In some embodiments, the processing system changes or steps the state of a game in which each of the participants controls one or more game entities by generating inputs for example with a game controller. The inputs are communicated to full simulation element 120, which, using the processing system responding to the instructions, changes the state of the game based on the inputs.

In some embodiments, full simulation element 120 is configured to receive all inputs from all participants and to step the simulation state of the entire simulation, for example by updating or changing game state information stored in memory. Accordingly, full simulation element 120 generates and manages data corresponding with the full state of the entire simulation.

In some embodiments, the full state of the entire simulation includes information which, if accessed by the participants of team A or if accessed by the participants of team B would give the accessing participants an unfair advantage, in the context of the simulation. For example, the full state of the entire simulation may include a map representing an entire area or space in the context of the game, and only a particular portion of the map may be expected or supposed to be visible or accessible to the participants of team A in the context of a fair game.

Team A partial simulation estimation element 122 includes or uses a processing system configured to access memory containing data representing a server team A partial simulation or game state, containing data representing inputs, and containing data representing instructions for the processing system to perform a partial simulation by changing or controlling the state of the server team A partial simulation or game. The partial simulation estimation element 122 performs the partial simulation based on the inputs and the instructions to generate an estimate of the server team A partial simulation or game by changing the data representing a server team A partial simulation or game state.

In some embodiments, to perform the partial simulation, the processing system may be configured to receive inputs representing actions of participants, and to calculate or simulate consequences of those actions on the server team A partial simulation or game state. In some embodiments, the processing system changes the state of the server team A partial simulation or game in response to inputs generated by participants for example with game controllers. The inputs are communicated to team A partial simulation estimation element 122, which, using the processing system responding to the instructions, changes the state of the server team A partial simulation or game based on the inputs.

In some embodiments, team A partial simulation estimation element 122 is configured to receive all inputs from all participants and to change or control the state of the server team A partial simulation or game, for example by updating or changing state information stored in the memory. In some embodiments, team A partial simulation estimation element 122 is configured to receive inputs from participants of team A, and to not receive inputs from participants of team B, and to change or control the state of the server team A partial simulation or game, for example by updating or changing state information stored in the memory. In some embodiments, team A partial simulation estimation element 122 is configured to receive only inputs from participants which affect the state of the server team A partial simulation or game, for example, as determined based on all inputs and their effect on the entire simulation. Team A partial simulation estimation element 122 may change or control the state of the server team A partial simulation or game, for example by updating or changing state information stored in the memory based on the inputs it receives and according to the instructions it executes. Accordingly, team A partial simulation estimation element 122 may generate and manage data corresponding with the state of the partial simulation for team A.

In some embodiments, the state of the server team A partial simulation or game includes information which is not expected or not supposed to be accessible to the participants of team A in the context of a fair simulation or game. For example, if the full simulation includes a map representing an area or space in the context of the game, the map information of the state of the server team A partial simulation or game may include map information which is not expected or not supposed to be accessible to the participants of team A in the context of a fair simulation or game.

In some embodiments, the state of the server team A partial simulation or game does not include information which is not expected or not supposed to be accessible to the participants of team A in the context of a fair game or simulation.

In some embodiments, the state of the server team A partial simulation or game does not include information which is expected or supposed to be accessible to the participants of team A in the context of a fair simulation or game. For example, if the full simulation includes a map representing an area or space in the context of the game, the map information of the state of the server team A partial simulation or game may omit map information which is expected or supposed to be accessible to the participants of team A in the context of a fair simulation or game.

Team B partial simulation estimation element 126 includes or uses a processing system configured to access memory containing data representing a server team B partial simulation or game state, containing data representing inputs, and containing data representing instructions for the processing system to perform a partial simulation by changing or controlling the state of the server team B partial simulation or game. The partial simulation estimation element 126 performs the partial simulation based on the inputs and the instructions to generate an estimate of the server team B partial simulation or game by changing the data representing a server team B partial simulation or game state.

In some embodiments, to perform the partial simulation, the processing system may be configured to receive inputs representing actions of participants, and to calculate or simulate consequences of those actions on the server team B partial simulation or game state. In some embodiments, the processing system changes the state of the server team B partial simulation or game in response to inputs generated by participants for example with game controllers. The inputs are communicated to team B partial simulation estimation element 126, which, using the processing system responding to the instructions, changes the state of the server team B partial simulation or game based on the inputs.

In some embodiments, team B partial simulation estimation element 126 is configured to receive all inputs from all participants and to change or control the state of the server team B partial simulation or game, for example by updating or changing state information stored in the memory. In some embodiments, team B partial simulation estimation element 126 is configured to receive inputs from participants of team B, and to not receive inputs from participants of team A, and to change or control the state of the server team B partial simulation or game, for example by updating or changing state information stored in memory. In some embodiments, team B partial simulation estimation element 126 is configured to receive only inputs from participants which affect the state of the server team B partial simulation or game, for example, as determined based on all inputs and their effect on the entire simulation. Team B partial simulation estimation element 126 may change or control the state of the server team B partial simulation or game, for example by updating or changing state information stored in the memory based on the inputs it receives and according to the instructions it executes. Accordingly, team B partial simulation estimation element 126 may generate and manage data corresponding with the state of the server partial simulation for team B.

In some embodiments, the state of the server team B partial simulation or game includes information which is not expected or not supposed to be accessible to the participants of team B in the context of a fair simulation or game. For example, if the full simulation includes a map representing an area or space in the context of the game, the map information of the state of the server team B partial simulation or game may include map information which is not expected or not supposed to be accessible to the participants of team B in the context of a fair simulation or game.

In some embodiments, the state of the server team B partial simulation or game does not include information which is not expected or not supposed to be accessible to the participants of team B in the context of a fair gain or simulation.

In some embodiments, the state of the server team B partial simulation or game does not include information which is expected or supposed to be accessible to the participants of team B in the context of a fair simulation or game. For example, if the full simulation includes a map representing an area or space in the context of the game, the map information of the state of the server team B partial simulation or game may omit map information which is expected or supposed to be accessible to the participants of team B in the context of a fair simulation or game.

In some embodiments, team A partial simulation estimation element 122 and team B partial simulation estimation element 126 are partly or wholly formed by a single element configured to perform the functions described herein with reference to both team A partial simulation estimation element 122 and team B partial simulation estimation element 126. For example, the single element may be time multiplexed to perform the functions of both team A partial simulation estimation element 122 and team B partial simulation estimation element 126 according to a serial or interleaved processing scheme, as understood by those of skill in the art.

In some embodiments, team A partial simulation estimation element 122 and team B partial simulation estimation element 126 are partly or wholly formed by separate elements, configured to respectively perform the functions described herein with reference to team A partial simulation estimation element 122 and team B partial simulation estimation element 126.

Team A patch generation element 124 includes or uses a processing system configured to access memory containing data representing the simulation state of the entire simulation, data representing the server team A partial simulation or game state, and data representing executable instructions for the processing system to generate a correction patch including information representing a difference between the server team A partial simulation or game state and portions of the entire simulation which are to be fairly accessible to the participants of team A. In some embodiments, the correction patch identifies information of the server team A partial simulation or game state which would not be accessed fairly by the participants of team A in the context of the simulation or game. In some embodiments, the correction patch identifies information of the entire simulation which is not included in the server team A partial simulation or game state, and which would be fairly accessed by the participants of team A in the context of the simulation or game.

Based at least partly on the data representing the simulation state of the entire simulation and the data representing the server team A partial simulation or game state, and according to the executable instructions, the processing system generates a correction patch for team A, as discussed in further detail elsewhere herein.

Team B patch generation element 128 includes or uses a processing system configured to access memory containing data representing the simulation state of the entire simulation, data representing the server team B partial simulation or game state, and data representing executable instructions for the processing system to generate a correction patch including information representing a difference between the server team B partial simulation or game state and portions of the entire simulation which are to be fairly accessible to the participants of team B. In some embodiments, the correction patch identifies information of the server team B partial simulation or game state which would not be accessed fairly by the participants of team B in the context of the simulation or game. In some embodiments, the correction patch identifies information of the entire simulation which is not included in the server team B partial simulation or game state, and which would be fairly accessed by the participants of team B in the context of the simulation or game.

Based at least partly on the data representing the simulation state of the entire simulation and the data representing the server team B partial simulation or game state, and according to the executable instructions, the processing system generates a correction patch for team B, as discussed in further detail elsewhere herein.

In some embodiments, team A patch generation element 124 and team B patch generation element 128 are partly or wholly formed by a single element configured to perform the functions described herein with reference to both team A patch generation element 124 and team B patch generation element 128. For example, the single element may be time multiplexed to perform the functions of both team A patch generation element 124 and team B patch generation element 128 according to a serial or interleaved processing scheme, as understood by those of skill in the art.

In some embodiments, team A patch generation element 124 and team B patch generation element 128 are partly or wholly formed by separate elements, configured to respectively perform the functions described herein with reference to team A patch generation element 124 and team B patch generation element 128.

In this embodiment, clients 150, 160, 170, and 180 each perform partial simulations, display graphical representations of the partial simulations, and receive inputs from an input device controlled by a participant from one of the teams A and B. Clients 150, 160, 170, and 180 each include a partial simulation estimation element 152, a patch integration element 154, and an input element 156.

Clients 150 and 160 are configured to receive inputs for team A transmitted by server 110, and are configured to perform partial simulations based on the inputs, for example, as discussed below. Clients 170 and 180 are configured to receive inputs for team B transmitted by server 110, and are configured to perform partial simulations based on the inputs, for example, as discussed below.

The partial simulation estimation elements 152 of clients 150 and 160 each include or use a processing system configured to access memory containing data representing a client team A partial simulation or game state, containing data representing inputs, and containing data representing instructions for the processing system to perform a partial simulation by changing or controlling the state of the client team A partial simulation or game. The partial simulation estimation elements 152 of clients 150 and 160 each perform the partial simulations based on the inputs and the instructions to generate an estimate of the team A partial simulation or game.

The partial simulation estimation elements 152 of clients 170 and 180 each include or use a processing system configured to access memory containing data representing a client team B partial simulation or game state and containing data representing instructions for the processing system to perform a partial simulation by changing or controlling the state of the client team B partial simulation or game. The partial simulation estimation elements 152 of clients 170 and 180 each perform the partial simulations based on the inputs and the instructions to generate an estimate of the team B partial simulation or game.

In some embodiments, the estimate of the team A partial simulation or game includes information which is not expected or not supposed to be accessible to the participants of team A in the context of a fair simulation or game. For example, if the full simulation includes a map representing an area or space in the context of the game, the map information of the estimate of the team A partial simulation or game may include map information which is not expected or not supposed to be accessible to the participants of team A in the context of a fair simulation or game. In some embodiments, the estimate of the team A partial simulation or game does not include information which is expected or supposed to be accessible to the participants of team A in the context of a fair simulation or game. For example, if the full simulation includes a map representing an area or space in the context of the game, the map information of the estimate of the server team A partial simulation or game may not include map information which is expected or supposed to be accessible to the participants of team A in the context of a fair simulation or game.

In some embodiments, the estimate of the team B partial simulation or game includes information which is not expected or not supposed to be accessible to the participants of team B in the context of a fair simulation or game. For example, if the full simulation includes a map representing an area or space in the context of the game, the map information of the estimate of the team B partial simulation or game may include map information which is not expected or not supposed to be accessible to the participants of team B in the context of a fair simulation or game. In some embodiments, the estimate of the team B partial simulation or game does not include information which is expected or supposed to be accessible to the participants of team B in the context of a fair simulation or game. For example, if the full simulation includes a map representing an area or space in the context of the game, the map information of the estimate of the server team B partial simulation or game may not include map information which is expected or supposed to be accessible to the participants of team B in the context of a fair simulation or game.

In some embodiments, to perform the partial simulation, the partial simulation estimation elements 152 may be configured to receive inputs representing actions of participants, and to calculate or simulate consequences of those actions on the corresponding client partial simulation or game state. In some embodiments, the partial simulation estimation elements 152 change the states of the client partial simulation or game in response to inputs generated by participants for example with game controllers. The inputs are communicated to the partial simulation estimation elements 152, which, using their processing system responding to the instructions, change the state of the client partial simulation or game based on the inputs.

In some embodiments, the partial simulation estimation elements 152 are configured to receive certain inputs from participants which affect the states of the client partial simulation or game, for example, as determined by server 110. The partial simulation estimation elements 152 may change or control the states of the client partial simulation or game, for example by updating or changing state information stored in the memory based on the inputs they receive and according to the instructions they execute.

The partial simulation estimation elements 152 for clients 150 and 160 may generate and manage partial simulation data corresponding with the states of the partial simulations for team A. In some embodiments, partial simulation estimation elements 152 for clients 150 and 160 generate estimates of the team A partial simulation or game, where the estimates of the team A partial simulation or game are partially or wholly or about wholly identical to the estimate of the server team A partial simulation or game generated by partial simulation estimation element 122.

Similarly, the partial simulation estimation elements 152 for clients 170 and 180 may generate and manage partial simulation data corresponding with the states of the partial simulations for team B. In some embodiments, partial simulation estimation elements 152 for clients 170 and 180 generate estimates of the team B partial simulation or game, where the estimates of the team B partial simulation or game are partially or wholly or about wholly identical to the estimate of the server team B partial simulation or game generated by partial simulation estimation element 126.

The patch generation elements 154 of clients 150 and 160 each include or use a processing system configured to access memory containing data representing the client team A partial simulation or game state, data representing a correction patch for team A received, for example, from a server, such as server 110, and containing data representing instructions for the processing system to integrate the correction patch into the partial simulation or game state by changing the state of the client team A partial simulation or game according to the correction patch.

For example, the correction patch may include information which the estimate of the team A partial simulation or game does not include, and which the server, when generating the correction patch, identified as being knowable or allowed to be known for the team A participants, for example, when using a process for generating correction patches having features similar or identical to those processes for generating correction patches discussed herein. In some embodiments, to integrate the correction patch into the estimate of the team A partial simulation or game state, patch generation elements 154 of clients 150 and 160 identify that knowable or allowed to be known information included in the correction patch which is not included in the estimate of the team A partial simulation or game state which they generate and manage. In addition, to integrate the correction patch into the estimate of the team A partial simulation or game state, patch generation elements 154 of clients 150 and 160 add the identified knowable or allowed to be known information to the partial simulation or game state.

In some embodiments, the correction patch includes information which estimate of the team A partial simulation or game does include, and which the server, when generating the correction patch, identified as being not knowable or not allowed to be known for the team A participants, for example, when using a process for generating correction patches having features similar or identical to those processes for generating correction patches discussed herein. In some embodiments, to integrate the correction patch into the estimate of the team A partial simulation or game state, patch generation elements 154 of clients 150 and 160 identify that information included in the correction patch which should not be included in the estimate of the team A partial simulation or game state which they generate and manage. In addition, to integrate the correction patch into the estimate of the team A partial simulation or game state, patch generation elements 154 of clients 150 and 160 remove the identified information from the estimate of the team A partial simulation or game state.

The patch generation elements 154 of clients 170 and 180 each include or use a processing system configured to access a memory containing data representing the client team B partial simulation or game state, data representing a correction patch for team B received, for example, from a server, such as server 110, and containing data representing instructions for the processing system to integrate the correction patch into the partial simulation or game state by changing the state of the client team B partial simulation or game according to the correction patch.

For example, the correction patch may include information which the estimate of the team B partial simulation or game does not include, and which the server, when generating the correction patch, identified as being knowable or allowed to be known for the team B participants, for example, when using a process for generating correction patches having features similar or identical to those processes for generating correction patches discussed herein. In some embodiments, to integrate the correction patch into the estimate of the team B partial simulation or game state, patch generation elements 154 of clients 170 and 180 identify that knowable or allowed to be known information included in the correction patch which is not included in the estimate of the team B partial simulation or game state which they generate and manage. In addition, to integrate the correction patch into the estimate of the team B partial simulation or game state, patch generation elements 154 of clients 170 and 180 add the identified knowable or allowed to be known information to the partial simulation or game state.

In some embodiments, the correction patch includes information which estimate of the team B partial simulation or game does include, and which the server, when generating the correction patch, identified as being not knowable or not allowed to be known for the team B participants, for example, when using a process for generating correction patches having features similar or identical to those processes for generating correction patches discussed herein. In some embodiments, to integrate the correction patch into the estimate of the team B partial simulation or game state, patch generation elements 154 of clients 170 and 180 identify that information included in the correction patch which should not be included in the estimate of the team B partial simulation or game state which they generate and manage. In addition, to integrate the correction patch into the estimate of the team B partial simulation or game state, patch generation elements 154 of clients 170 and 180 remove the identified information from the estimate of the team B partial simulation or game state.

Input elements 156 of clients 150 and 160 are configured to receive inputs from the participants of team A, which are generated, for example, by the team A participant's use of a game controller. Input elements 156 of clients 170 and 180 are configured to receive inputs from the participants of team B, which are generated, for example, by the team B participants use of a game controller. The input elements 156 of clients 150, 160, 170, and 180 are also configured to transmit data corresponding with the received inputs to the server so that the server may change or control the simulation state of the entire simulation and the partial simulations, using aspects of methods and processes discussed elsewhere herein.

As understood by those of skill in the art, in some embodiments, a simulation or game may be executed as a series or sequence of simulation or game steps, where the simulation or game state is calculated at each step based in part on the simulation or game state of the previous step and based in part on any newly available inputs.

Figure 2:
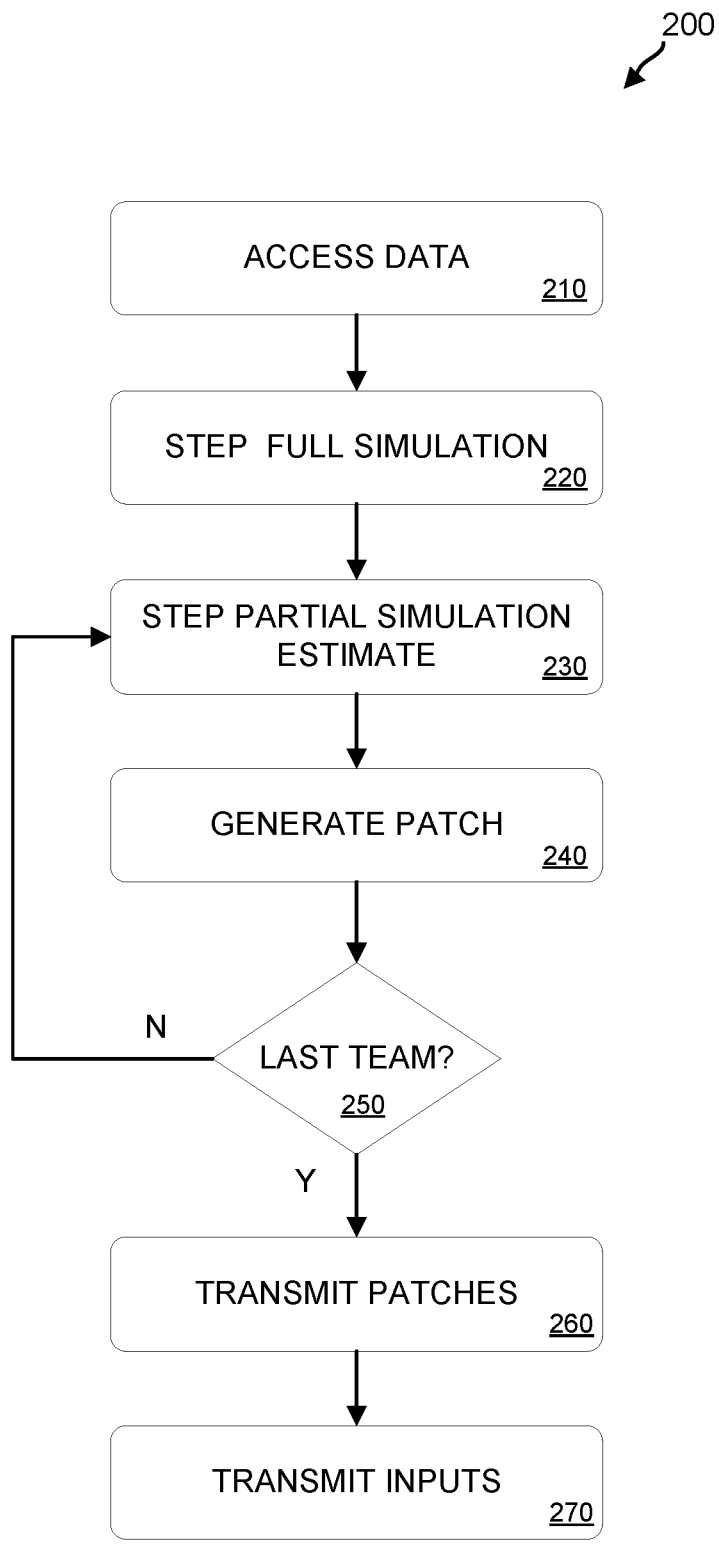
FIG. 2 is a schematic flowchart diagram illustrating a method of managing a network simulation system according to some embodiments.

FIG. 2 is schematic flowchart diagram illustrating a process 200 of operating a network simulation system to at least partly calculate a next simulation or game step according to some embodiments. Some or all of the process 200 (or any other processes described herein, or variations, and/or combinations thereof) may be performed by or under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. For example, process 200 may be performed by an embodiment of server 110 of the network simulation system 100 or another computer system having features similar or identical to network simulation system 100.

At 210, a processing system accesses data stored in memory, where the data represents a simulation or game state, represents actions or instructions of participants received as inputs, and represents instructions for the processing system. In some embodiments, the data representing actions or instructions of participants includes data representing actions or instructions of participants of other teams. In some embodiments, the data representing actions or instructions of participants does not include data representing actions or instructions of participants of other teams.

At 220, the processing system executes instructions to run a simulation by changing or controlling, for example, by advancing or stepping the state of the simulation or game according to the accessed data. For example, the processing system may calculate or simulate consequences of participant actions on the simulation or game state according to a current simulation or game state, according to the inputs, and according to the instructions.

In some embodiments, the processing system receives all inputs from all participants and steps the simulation state of the entire simulation, for example by updating or changing game state information stored in the memory. Accordingly, at 220, the processing system generates and manages data corresponding with the full state of the entire simulation.

At 230, the processing system accesses data in memory representing a current partial simulation or game state for a particular one team of a number of teams, representing actions of participants received as inputs, and representing instructions for the processing system to step a partial simulation for the particular one team to generate an estimate by stepping or advancing the state of the current partial simulation or game for the particular one team. In some embodiments, the processing system accesses data in memory representing a previously generated correction patch, and applies the previously generated correction patch to the data representing the current partial simulation or game state for the particular one team prior to stepping the partial simulation for the particular one team. In addition, at 230, the processing system may calculate or simulate consequences of participant actions on the partial simulation or game state estimate for the particular one team according to a current simulation or game state, according to the inputs, and according to the instructions. The processing system performs the partial simulation based on the inputs and the instructions to generate an estimate of the partial simulation or game for the particular one team.

In some embodiments, the partial simulation or game state estimate for the particular one team generated at 230 includes information which is not expected or not supposed to be accessible to the participants of the particular one team. For example, if the full simulation includes a map representing an area or space in the context of the game, the map information of the partial simulation or game state estimate for the particular one team generated at 230 may include map information which is not expected or not supposed to be accessible to the participants of the particular one team in the context of a fair simulation or game.

In some embodiments, the partial simulation or game state estimate for the particular one team generated at 230 does not include information which is expected or supposed to be accessible to the participants of the particular one team. For example, if the full simulation includes a map representing an area or space in the context of the game, the map information of the partial simulation or game state estimate for the particular one team generated at 230 may not include map information which is expected or supposed to be accessible to the participants of the one particular team in the context of a fair simulation or game.

In some embodiments, 220 and 230 are done sequentially. In some embodiments, 220 and 230 are performed in parallel. In some embodiments, multiple occurrences of 230 occur sequentially. In some embodiments, some or all occurrences of 230 occur in parallel.

At 240, the processing system accesses data in memory representing the simulation state of the entire simulation generated at 220, data representing the partial simulation or game state estimate for the particular one team generated at 230, and data representing executable instructions for the processing system to generate a correction patch. Based at least partly on the data representing the simulation state of the entire simulation and the data representing the partial simulation or game state estimate for the particular one team, and according to the executable instructions, the processing system generates a correction patch for the particular one team. In some embodiments, the correction patch includes information representing a difference between the partial simulation or game state estimate for the particular one team and portions of the entire simulation which are to be fairly accessible to the participants of the particular one team. For example, every object in the data representing the simulation state of the entire simulation may be examined to determine whether it should be present in the data representing the partial simulation or game state estimate for the particular one team. In addition, each object in the data representing the partial simulation or game state estimate for the particular one team may be examined to determine differences from that represented in the data representing the simulation state of the entire simulation for inclusion in the correction patch. In some embodiments, the correction patch identifies information of the partial simulation or game state estimate for the particular one team which would not be accessed fairly by the participants of the particular one team in the context of the simulation or game. In some embodiments, the correction patch identifies information of the entire simulation which is not included in the partial simulation or game state estimate for the particular one team, and which would be fairly accessed by the participants of the particular one team in the context of the simulation or game.

In some embodiments, to distinguish which information would not be accessed fairly by the participants of the particular one team in the context of the simulation or game, from information which would be accessed fairly, the processing system filters based on one or more accessibility characteristics. For example, information having accessibility characteristics indicating that the information is fairly accessible by the participants of the particular one team is identified, and if not included in the partial simulation or game state estimate for the particular one team, is included in the correction patch so that the information may be presented to the participants of the particular one team by being represented, for example, visually, for example with a display, audibly, for example with a speaker, haptically with a game controller, and/or in another way. In some embodiments, the accessibility characteristics include one or more of being, in the context of the game, fairly knowable to the participants of the particular one team. For example, in some embodiments, information may be identified as being visible by virtue of the information being associated with an entity or object or thing being in a line of sight and within a maximum distance of any of the participants of the particular one team. In some embodiments, information may be identified as hearable or feelable by virtue of the information being associated with an entity or object or thing being within a maximum distance of any of the participants of the particular one team. As understood by those of skill in the art, details for conditions used to determine whether information is visible or knowable is dependent on design details of the particular simulation or game.

In some embodiments, at 240 the generated correction patch is used to modify and update the partial simulation or game state estimate for the particular one team generated at 230. As a result, at a next occurrence of 230, the partial simulation or game state estimate for the particular one team is stepped from the partial simulation or game state estimated for the particular one team as modified based on the correction patch.

In some embodiments, multiple occurrences of 240 occur sequentially. In some embodiments, some or all occurrences of 240 occur in parallel.

At 250, the processing system determines whether in any additional partial simulations and correction patches are to be generated. If the most recent occurrences of 230 and 240 were performed for a team other than the last team, the process 200 returns to 230. If the most recent occurrences of 230 and 240 were performed for the last team the process 200 continues to 260.

At 260, the correction patches generated at 240 are transmitted to clients for each of the respective teams. For example, the correction patches generated at 240 for a first team are transmitted to clients for each of the participants of the first team, and are not transmitted to clients for any of the participants of teams other than the first team. Similarly, the correction patches generated at 240 for a second team may be transmitted to clients for each of the participants of the second team, and, in some embodiments, are not transmitted to clients for any of the participants of teams other than the second team.

At 270, the processing system transmits inputs to the clients of all participants. In some embodiments, all of the clients receive all inputs generated by any of the participants. In some embodiments, the clients receive all inputs generated by the participants of the same team, and do not receive inputs from participants of other teams. In some embodiments, each particular clients receives inputs generated by the participant of the particular client, and does not receive inputs from other participants. In some embodiments, the processing system transmits inputs which affect the partial simulation or game state estimate of the first team to the clients for each of the participants of the first team, for example, as determined by the processing system based on all inputs and their effect on the entire simulation. In some embodiments, the processing system does not transmit inputs which do not affect the partial simulation or game state estimate of the first team to the clients for each of the participants of the first team, for example, as determined by the processing system based on all inputs and their effect on the entire simulation. In some embodiments, the processing system transmits inputs which affect the partial simulation or game state estimate of the second team to the clients for each of the participants of the second team, for example, as determined by the processing system based on all inputs and their effect on the entire simulation. In some embodiments, the processing system does not transmit inputs which do not affect the partial simulation or game state estimate of the second team to the clients for each of the participants of the second team, for example, as determined by the processing system based on all inputs and their effect on the entire simulation.

In some embodiments, 270 occurs after 260. In some embodiments, 270 occurs before 260. In some embodiments, 260 and 270 occur as part of a same data transfer. In some embodiments, 270 occurs before 220. In some embodiments, the various actions of process 200 are performed in a sequence not specifically described herein.

Figure 3:
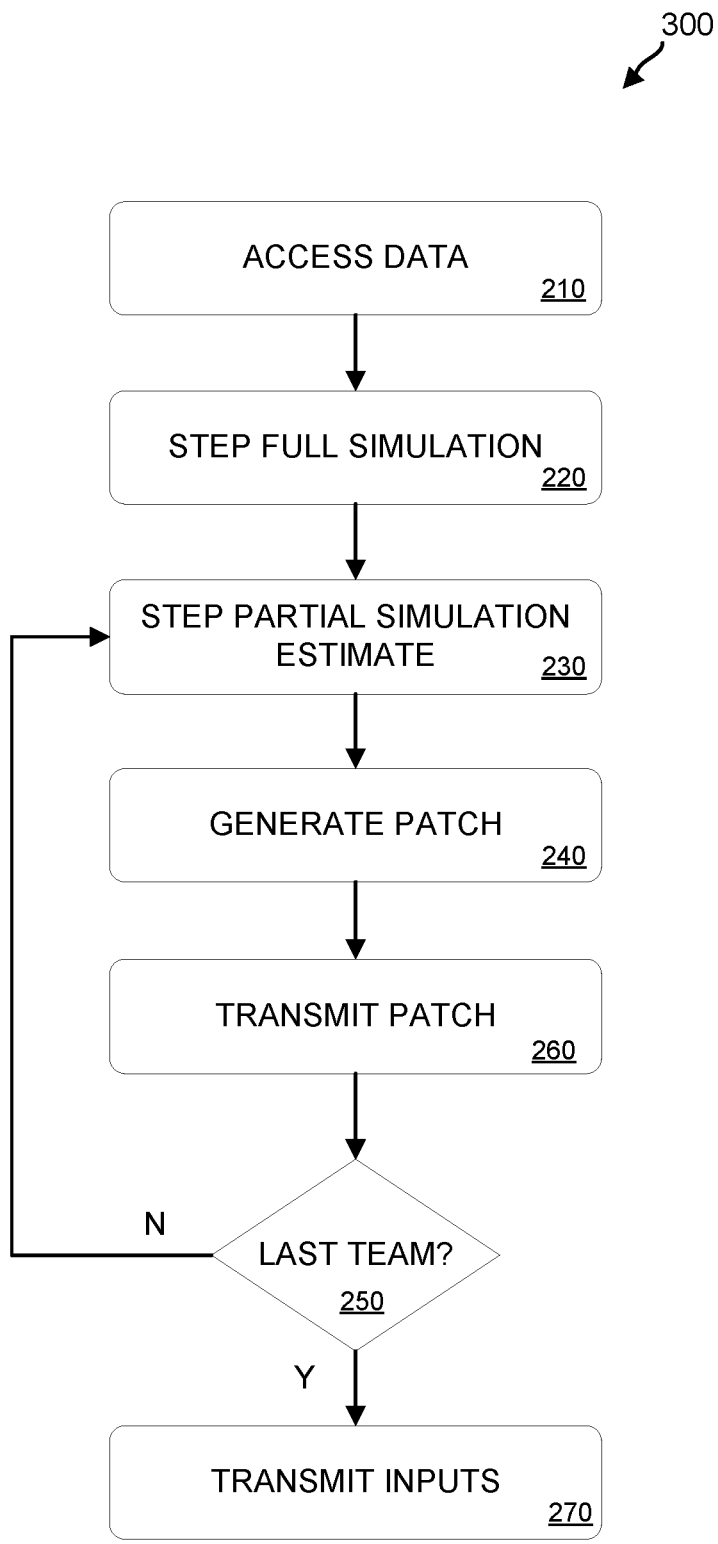
FIG. 3 is a schematic flowchart diagram illustrating a method of managing a network simulation system according to some embodiments.

FIG. 3 is schematic flowchart diagram illustrating a process 300 of operating a network simulation system to at least partly calculate a next simulation or game step according to some embodiments. Process 300 may be performed by an embodiment of server 110 of the network simulation system 100 or another computer system having features similar or identical to network simulation system 100.

Process 300 includes features and actions similar or identical to those of 210, 220, 230, 240, 250, 260, and 270 of process 200. However, as illustrated, at 260, the correction patches generated at 240 are transmitted to clients for each of the respective teams after 240 and before 250. Accordingly, in embodiments of process 300, the inputs are transmitted at 270 after or immediately after 250.

Transmitting the inputs at 270 may be done at any point in the process, and is not limited to the illustrated embodiment. For example, in some embodiments, 270 occurs before 220. In some embodiments, 270 occurs before 220 and in some embodiments of process 600, discussed below, 630 occurs before 620. Correction patches may be transmitted at 260 at any time after they are generated at 240. Accordingly, the position of 260 in alternative embodiments is not limited to that illustrated in FIG. 3.

In some embodiments, the various actions of process 300 are performed in a sequence not specifically described herein.

Figure 4:
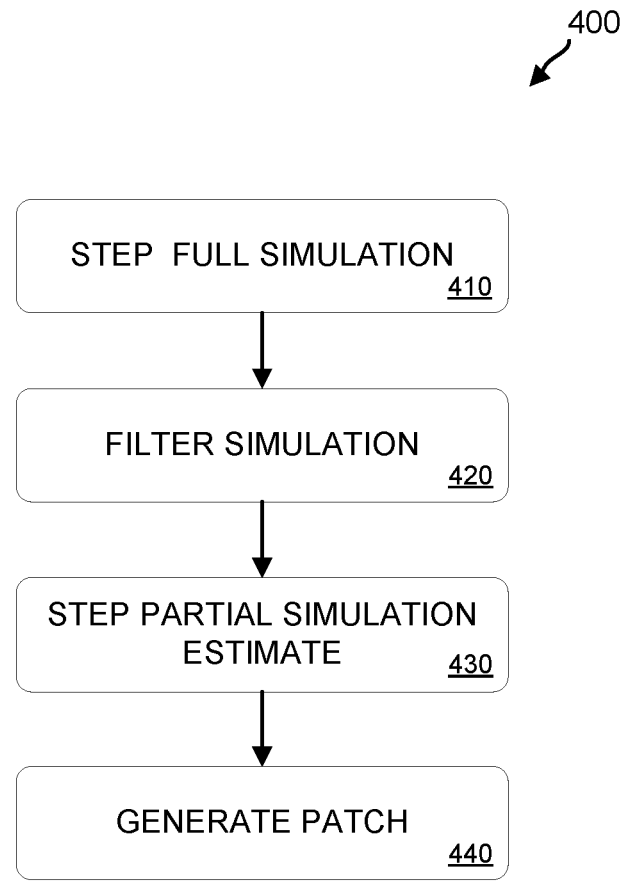
FIG. 4 is a schematic flowchart diagram illustrating a method of determining a correction patch according to some embodiments.

FIG. 4 is schematic flowchart diagram illustrating a process 400 of determining a correction patch for a particular one team of a plurality of teams participating in a simulation or game, for example, at a simulation or game step, according to some embodiments. Process 400 may be performed by an embodiment of server 110 of the network simulation system 100 or another computer system having features similar or identical to network simulation system 100.

In some embodiments, process 400 may be performed by a server having features similar or identical to those of server 110.

At 410, a processing system accesses data stored in memory, where the data represents a simulation or game state, represents actions of participants received as inputs, and represents instructions for the processing system. In addition, the processing system executes instructions to run a full simulation by stepping the state of the full simulation or game according to the accessed data. For example, the processing system may calculate or simulate consequences of participant actions on the simulation or game state according to a current simulation or game state, according to the inputs, and according to the instructions.

In some embodiments, the processing system receives all inputs from all participants from all teams and steps the full simulation state of the entire simulation, for example by updating or changing game state information stored in memory. Accordingly, at 410, the processing system generates and manages data corresponding with the full state of the entire simulation.

At 420, the processing system generates a reference partial simulation state for the particular one team. For example, the processing system may access data stored in memory, where the data represents the information of the entire or full simulation, represents conditions for determining what information is to be accessible to the participants of the one particular team in the context of a fair game, and represents instructions for the processing system to generate a representation of a portion of the full simulation, with the generated portion of the full simulation including information accessible to the participants of the one particular team in the context of a fair game, and not including information which is not accessible to the participants of the one particular team in the context of a fair game, and which would be discernable by a client of a participant from the particular one team.

To generate the reference partial simulation state for the particular one team, the processing system identifies that information from the full simulation which would be accessible to the participants of the one particular team in the context of a fair game according to the accessed condition information. In addition, the processing system includes the identified information in the reference partial simulation state for the particular one team, and excludes information which is not accessible to the participants of the one particular team in the context of a fair game, and which would be discernable by a client of a participant from the particular one team.

At 430, the processing system accesses data in memory representing a partial simulation or game state for the particular one team, representing actions of participants received as inputs, and representing instructions for the processing system to perform a partial simulation for the particular one team to generate an estimate by stepping the state of the partial simulation or game for the particular one team. In some embodiments, the processing system accesses data in memory representing a previously generated correction patch, and applies the previously generated correction patch to the data representing the current partial simulation or game state for the particular one team prior to stepping the partial simulation for the particular one team. In addition, at 430, the processing system may calculate or simulate consequences of participant actions on the partial simulation or game state estimate for the particular one team according to a current simulation or game state, according to the inputs, and according to the instructions. The processing system performs the partial simulation based on the inputs and the instructions to generate an estimate of the partial simulation or game for the particular one team.

In some embodiments, the partial simulation or game state estimate for the particular one team generated at 430 includes information which is not expected or not supposed to be accessible to the participants of the particular one team in the context of a fair simulation or game. For example, if the full simulation includes a map representing an area or space in the context of the game, the map information of the partial simulation or game state estimate for the particular one team generated at 430 may include map information which is not expected or not supposed to be accessible to the participants of the particular one team in the context of a fair simulation or game.

In some embodiments, the partial simulation or game state estimate for the particular one team generated at 430 does not include information which is expected or supposed to be accessible to the participants of the particular one team in the context of a fair simulation or game. For example, if the full simulation includes a map representing an area or space in the context of the game, the map information of the partial simulation or game state estimate for the particular one team generated at 430 may not include map information which is expected or supposed to be accessible to the participants of the one particular team in the context of a fair simulation or game.

In some embodiments, 420 occurs before 430. In some embodiments, 430 occurs before 420. In some embodiments, the various actions are performed in a sequence not specifically described herein.

At 440, the processing system accesses data in memory representing the reference partial simulation state for the particular one team generated at 420, data representing the partial simulation or game state estimate for the particular one team generated at 430, and data representing executable instructions for the processing system to generate a correction patch. In some embodiments, the data representing the reference partial simulation state for the particular one team generated at 420 is serialized. In some embodiments, the data representing the partial simulation or game state estimate for the particular one team generated at 430 is serialized. Based at least partly on the data representing the state of the reference partial simulation state for the particular one team and the data representing the partial simulation or game state estimate for the particular one team, and according to the executable instructions, the processing system generates a correction patch for the particular one team. In some embodiments, the correction patch includes information representing a difference between the partial simulation or game state estimate for the particular one team and the reference partial simulation state for the particular one team. In some embodiments, the processing system determines information of the partial simulation or game state estimate for the particular one team which is not included in the reference partial simulation state for the particular one team and includes the determined information in the correction patch, where the determined information is identified in the correction patch as information which would not be accessed fairly by the participants of the particular one team in the context of the simulation or game. In some embodiments, the processing system determines information of the reference partial simulation state for the particular one team which is not included in the partial simulation or game state estimate for the particular one team and includes the determined information in the correction patch, where the determined information is identified in the correction patch as information which would be fairly accessed by the participants of the particular one team in the context of the simulation or game.

In some embodiments, the various actions of process 400 are performed in a sequence not specifically described herein.

Figure 5:
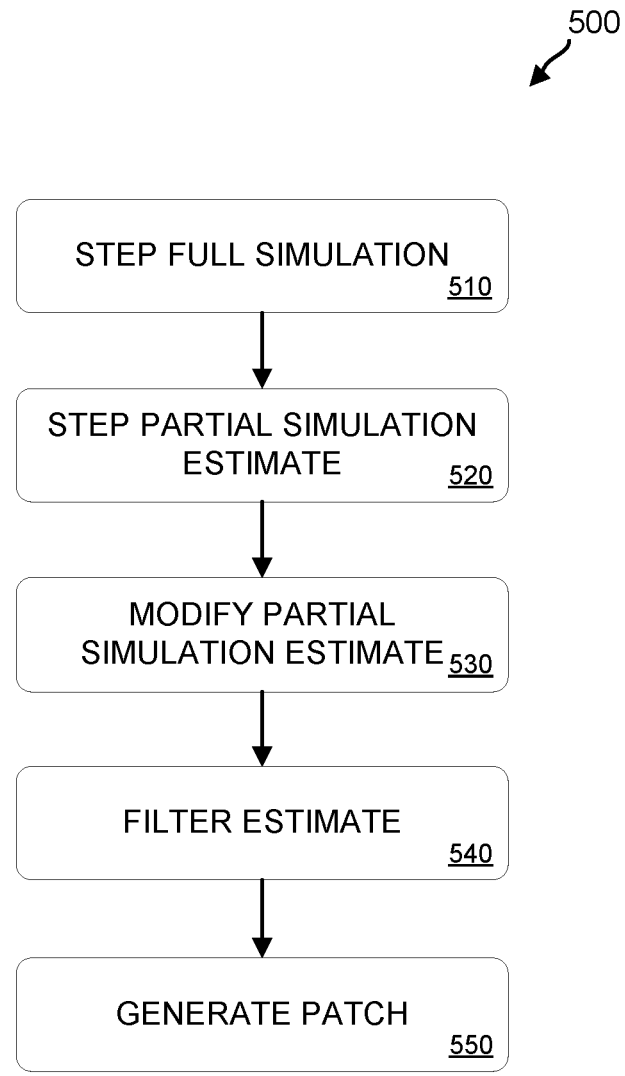
FIG. 5 is a schematic flowchart diagram illustrating a method of determining a correction patch according to some embodiments.

FIG. 5 is schematic flowchart diagram illustrating a process 500 of determining a correction patch for a particular one team of a plurality of teams participating in a simulation or game, for example, at a simulation or game step, according to some embodiments. Process 500 may be performed by an embodiment of the network simulation system 100 or another computer system having features similar or identical to network simulation system 100. In some embodiments, process 500 may be performed by a server having features similar or identical to those of server 110.

At 510, a processing system accesses data stored in memory, where the data represents a simulation or game state, represents actions of participants received as inputs, and represents instructions for the processing system. In addition, the processing system executes instructions to run a full simulation by stepping the state of the full simulation or game according to the accessed data. For example, the processing system may calculate or simulate consequences of participant actions on the simulation or game state according to a current simulation or game state, according to the inputs, and according to the instructions. In some embodiments, the processing system receives all inputs from all participants from all teams and steps the full simulation state of the entire simulation, for example by updating or changing game state information stored in memory. Accordingly, at 510, the processing system generates and manages data corresponding with the full state of the entire simulation.

At 520, the processing system accesses data in memory representing a partial simulation or game state for the particular one team, representing actions of participants received as inputs, and representing instructions for the processing system to perform a partial simulation for the particular one team to generate an estimate by stepping the state of the partial simulation or game for the particular one team. In some embodiments, the processing system accesses data in memory representing a previously generated correction patch, and applies the previously generated correction patch to the data representing the current partial simulation or game state for the particular one team prior to stepping the partial simulation for the particular one team. In addition, at 520, the processing system may calculate or simulate consequences of participant actions on the partial simulation or game state estimate for the particular one team according to a current simulation or game state, according to the inputs, and according to the instructions. The processing system performs the partial simulation based on the inputs and the instructions to generate an estimate of the partial simulation or game for the particular one team.

In some embodiments, the partial simulation or game state estimate for the particular one team generated at 520 includes information which is not expected or not supposed to be accessible to the participants of the particular one team in the context of a fair simulation or game. For example, if the full simulation includes a map representing an area or space in the context of the game, the map information of the partial simulation or game state estimate for the particular one team generated at 520 may include map information which is not expected or not supposed to be accessible to the participants of the particular one team in the context of a fair simulation or game. In some embodiments, the partial simulation or game state estimate for the particular one team generated at 520 does not include information which is expected or supposed to be accessible to the participants of the particular one team in the context of a fair simulation or game. For example, if the full simulation includes a map representing an area or space in the context of the game, the map information of the partial simulation or game state estimate for the particular one team generated at 520 may not include map information which is expected or supposed to be accessible to the participants of the one particular team in the context of a fair simulation or game.

At 530, the processing system accesses data in memory representing the full simulation state of the entire simulation generated at 510, data representing the partial simulation or game state estimate for the particular one team generated at 520, and data representing executable instructions for the processing system to modify the data representing the partial simulation or game state estimate. Based at least in part on the data representing the full simulation state of the entire simulation and the data representing the partial simulation or game state estimate for the particular one team, the processing system adds data from the data representing the full simulation state of the entire simulation to the data representing the partial simulation or game state estimate for the particular one team. In some embodiments, the processing system adds all data from the data representing the full simulation state of the entire simulation to the data representing the partial simulation or game state estimate for the particular one team. In some embodiments, the processing system adds a subset of the data from the data representing the full simulation state of the entire simulation to the data representing the partial simulation or game state estimate for the particular one team. In some embodiments, the processing system adds data from the data representing the full simulation state of the entire simulation to the data representing the partial simulation or game state estimate for the particular one team, where the added data is that data from the data representing the full simulation state of the entire simulation which is not included in the data representing the partial simulation or game state estimate for the particular one team. In some embodiments, the processing system adds data from the data representing the full simulation state of the entire simulation to the data representing the partial simulation or game state estimate for the particular one team, where the added data is that data from the data representing the full simulation state of the entire simulation which is not specified or is not set to particular values in the data representing the partial simulation or game state estimate for the particular one team.

At 540, the processing system generates a reference partial simulation state for the particular one team. For example, the processing system may access data stored in memory, where the data represents the partial simulation or game state estimate as modified at 530, represents conditions for determining what information is accessible to the participants of the one particular team in the context of a fair game, and represents instructions for the processing system to generate a representation of a portion of the modified data representing the partial simulation or game state estimate, with the generated portion including information accessible to the participants of the one particular team in the context of a fair game, and not including information which is not accessible to the participants of the one particular team in the context of a fair game, and which would be discernable by a client of a participant from the particular one team.

To generate the reference partial simulation state for the particular one team, the processing system identifies that information from the modified data representing the partial simulation or game state estimate which would be accessible to the participants of the one particular team in the context of a fair game according to the accessed condition information. In addition, the processing system includes the identified information in the reference partial simulation state for the particular one team, and excludes information which is not accessible to the participants of the one particular team in the context of a fair game, and which would be discernable by a client of a participant from the particular one team.

In some embodiments, 530 and 540 are performed separately, such that the modified partial simulation estimate generated at 530 is filtered at 540, for example, as discussed. In some embodiments, 530 and 540 are combined and performed as a single operation. In other embodiments, 540 is omitted.

At 550, the processing system accesses data in memory representing the reference partial simulation state for the particular one team generated at 540, data representing the partial simulation or game state estimate for the particular one team generated at 520, and data representing executable instructions for the processing system to generate a correction patch. In some embodiments, the data representing the reference partial simulation state for the particular one team generated at 540 is serialized. In some embodiments, the data representing the partial simulation or game state estimate for the particular one team generated at 520 is serialized. Based at least partly on the data representing the state of the reference partial simulation state for the particular one team and the data representing the partial simulation or game state estimate for the particular one team, and according to the executable instructions, the processing system generates a correction patch for the particular one team. In some embodiments, the correction patch includes information representing a difference between the partial simulation or game state estimate for the particular one team and the reference partial simulation state for the particular one team. In some embodiments, the processing system determines information of the partial simulation or game state estimate for the particular one team which is not included in the reference partial simulation state for the particular one team and includes the determined information in the correction patch, where the determined information is identified in the correction patch as information which would not be accessed fairly by the participants of the particular one team in the context of the simulation or game. In some embodiments, the processing system determines information of the reference partial simulation state for the particular one team which is not included in the partial simulation or game state estimate for the particular one team and includes the determined information in the correction patch, where the determined information is identified in the correction patch as information which would be fairly accessed by the participants of the particular one team in the context of the simulation or game.

In some embodiments, the reference partial simulation estimate is modified as the patch is generated. In some embodiments, the generated patch is applied to the reference partial simulation estimate after the patch is generated.

In some embodiments, the various actions of process 500 are performed in a sequence not specifically described herein.

Figure 6:
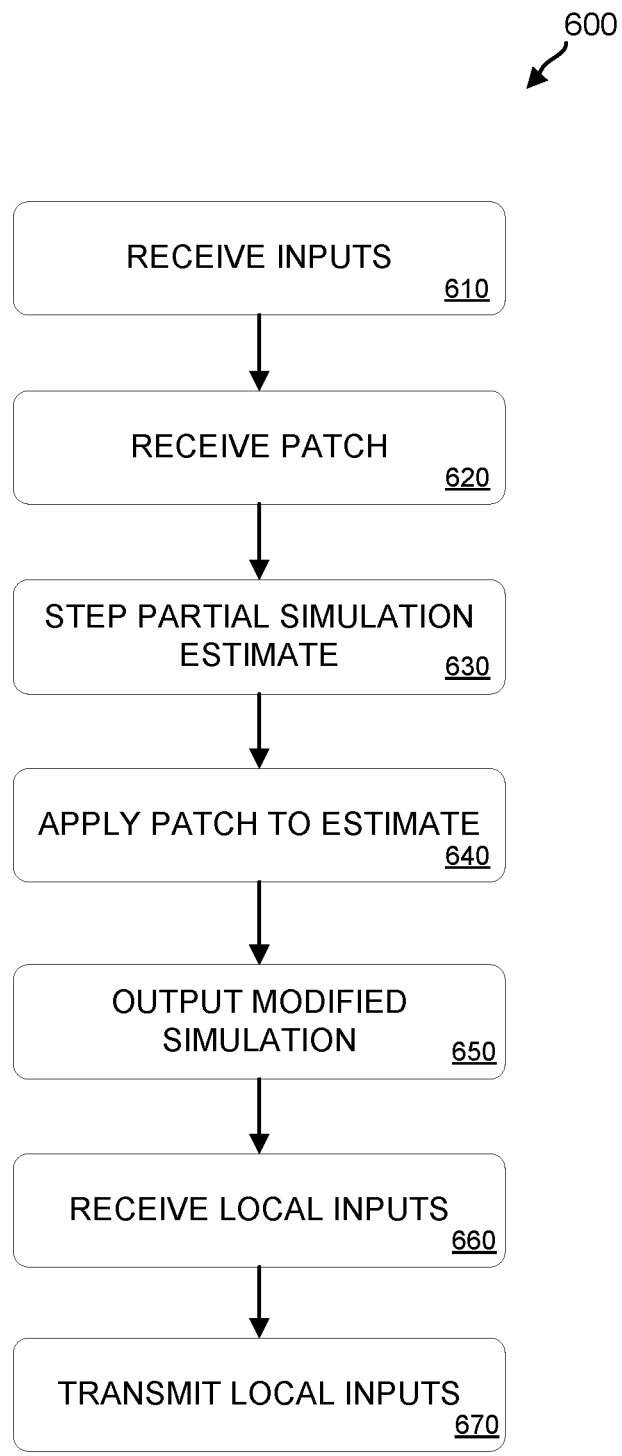
FIG. 6 is a schematic flowchart diagram illustrating a method of using a correction patch according to some embodiments.

FIG. 6 is schematic flowchart diagram illustrating a process 600 of using a correction patch for a particular one team of a plurality of teams participating in a simulation or game, for example, at a simulation or game step, according to some embodiments.

Process 600 may be performed by an embodiment of the network simulation system 100 or another computer system having features similar or identical to network simulation system 100. In some embodiments, process 600 may be performed by a client having features similar or identical to those of clients 150, 160, 170, and/or 180 of network simulation system 100.

At 610, a memory structure of the client receives and stores data of inputs representing actions of participants of the simulation or game. The data may be received, for example, from a server having features similar or identical to server 110 of network simulation system 100. The inputs may be generated by participants, for example, using game controllers, and communicated to the server. In some embodiments, the inputs or the data of the inputs have features similar or identical to features discussed elsewhere herein and related to inputs or the data of inputs.

At 620, a memory structure of the client receives and stores data representing a correction patch. The data may be received, for example, from a server having features similar or identical to server 110 of network simulation system 100. The correction patch may be generated by the server, for example, using a process having features similar or identical to those processes discussed elsewhere herein and related to generating correction patches. In some embodiments, the correction patch has features similar or identical to features discussed elsewhere herein and related to correction patches.

In some embodiments, 610 occurs before 620. In some embodiments, 620 occurs before 610. In some embodiments, 610 and 620 occur as part of a same data transfer. In some embodiments, 630 occurs between 620 and 640. In some embodiments, 630 occurs after 670. In some embodiments, the various actions are performed in a sequence not specifically described herein.

At 630, a processing system generates an estimate of a partial simulation or game for the particular one team. The estimate may have features similar or identical to estimates discussed elsewhere herein. To generate the estimate, the processing system accesses memory containing data representing a partial simulation or game state for the particular one team, containing data representing the inputs, and containing data representing instructions for the processing system to perform a partial simulation by stepping the state of the partial simulation or game. The partial simulations are performed according to the inputs and the instructions to modify the data representing the partial simulation or game state for the particular one team in order to generate the estimate.

In some embodiments, the estimate of the simulation or game includes information which is not expected or not supposed to be accessible to the participants of the particular one team in the context of a fair simulation or game. For example, if the full simulation includes a map representing an area or space in the context of the game, the map information of the estimate of partial simulation or game for the particular one team may include map information which is not expected or not supposed to be accessible to the participants of the particular one team in the context of a fair simulation or game. In some embodiments, the estimate of the partial simulation or game does not include information which is expected or supposed to be accessible to the participants of the particular one team in the context of a fair simulation or game. For example, if the full simulation includes a map representing an area or space in the context of the game, the map information of the estimate of the partial simulation or game may not include map information which is expected or supposed to be accessible to the participants of the particular one team in the context of a fair simulation or game.

In some embodiments, the estimate of the partial simulation or game for the particular one team is partially or wholly or about wholly identical to an estimate of the partial simulation or game for the particular one team generated by the server, and used by the server to generate the correction patch.

At 640, the processing system modifies the estimate of the partial simulation or game for the particular one team by integrating the information of the correction patch into the estimate. The modified estimate may have features similar or identical to those features of modified estimates discussed elsewhere herein.

To modify the estimate, the processing system accesses memory containing data representing the client team A partial simulation or game state, data representing the correction patch for the particular one team, and data representing instructions for the processing system to integrate the correction patch into the estimate. For example, the correction patch may include information which the estimate does not include, and which the server, when generating the correction patch, identified as being knowable or allowed to be known for the participants of the particular one team, for example, when using a process for generating correction patches having features similar or identical to those processes for generating correction patches discussed herein. In some embodiments, to integrate the correction patch into the estimate the processing system identifies the knowable or allowed to be known information included in the correction patch which is not included in the estimate. In addition, to integrate the correction patch into the estimate the processing system adds the identified knowable or allowed to be known information to the estimate.

In some embodiments, the correction patch includes information which the estimate of does include, and which the server, when generating the correction patch, identified as being not knowable or not allowed to be known for the participants of the particular one team, for example, when using a process for generating correction patches having features similar or identical to those processes for generating correction patches discussed herein. In some embodiments, to integrate the correction patch into the estimate, the processing system identifies the information included in the correction patch which should not be included in the estimate. In addition, to integrate the correction patch into the estimate, the processing system removes the identified information from the estimate.

At 650, the processing system causes a representation of the modified estimate to be presented to a participant of the particular one team. For example, the processing system may cause a graphical representation of the modified estimate to be presented on a display visible to the participant of the particular one team. In some embodiments, the processing system causes an audio representation of the modified estimate presented to the participant of the particular one team, for example, using a speaker.

At 660, local inputs are received from a participant of the particular one team. The local inputs may be generated, for example, by the participant of the particular one team using a game controller.

At 670, information representing the local inputs are transmitted to the server so that the server may step a simulation state of the entire simulation and partial simulations, using aspects of methods and processes discussed elsewhere herein. In some embodiments, 660 and 670 occur prior to 610.

When terms descriptive of simulations, such as fair and unfair, are used herein, they are to be construed according to the understanding of one of ordinary skill in the art. For example, fair may correspond to no one participant having an advantage over another as a result of information received from the server, other than those advantages understood and expected by those of skill in the art. Fair may correspond to no one participant having an advantage over another as a result of information received from the server which is not identified by the server as being intended for the participant. Fair may correspond to no one participant having an advantage over another as a result of information received from the server which is not representable to the participant by the simulation or game software being used by all participants of all teams. Fair may correspond to no one participant having an advantage over another as a result of information received from the server which is representable to the participant only by software other than the simulation or game software being used by all participants of all teams. As understood by those of skill in the art, advantages resulting from certain aspects, such as technical aspects, for example, faster network speeds, faster computers, better controllers, and/or closer distances to the server are expected.

In some embodiments, the various actions of process 600 are performed in a sequence not specifically described herein.

Figure 7:
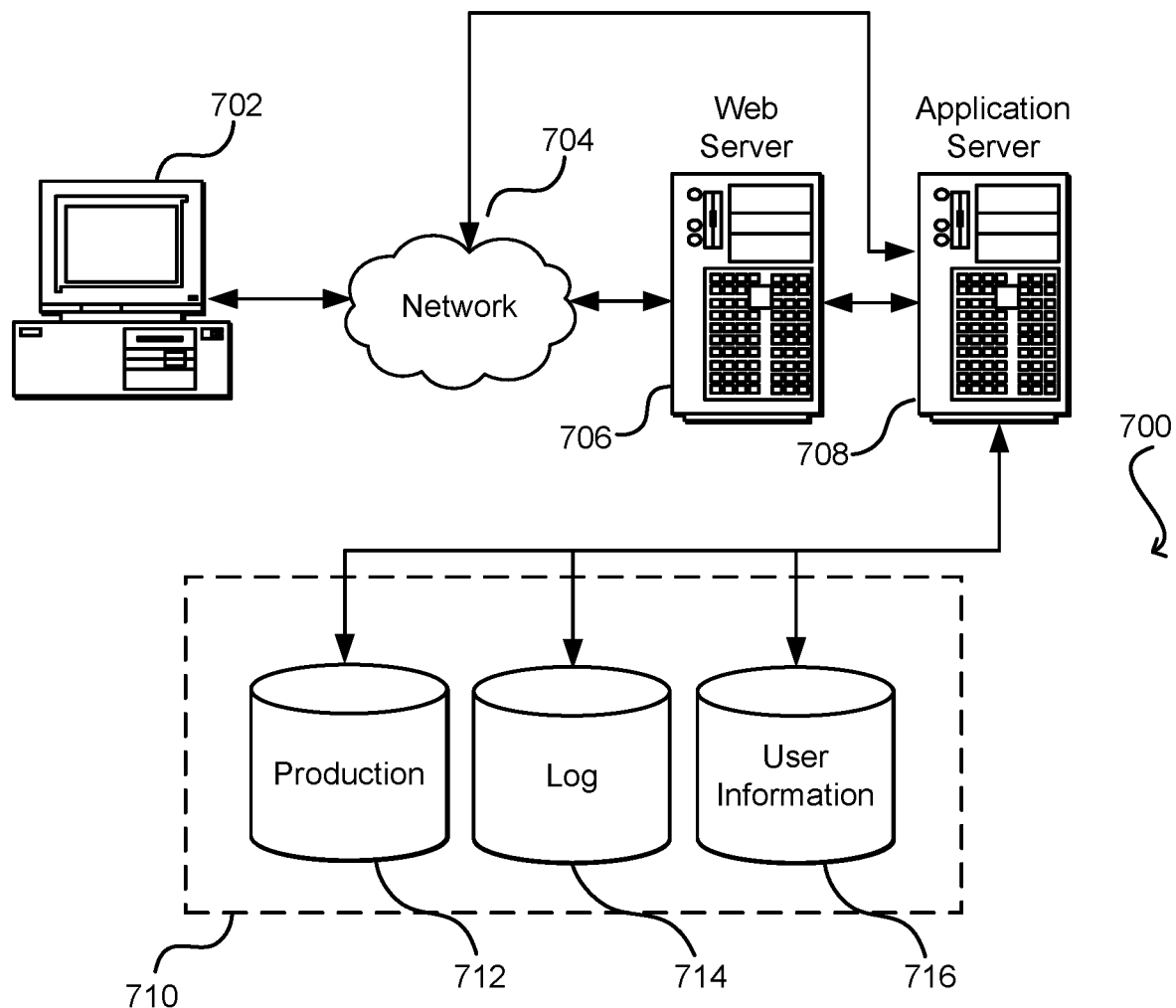
FIG. 7 illustrates an environment in which various embodiments can be implemented.

FIG. 7 illustrates an environment in which various embodiments can be implemented.

Techniques described herein include network simulation systems and methods used by the network simulation systems to execute and manage simulations or games, for example, having two or more teams, where each team includes one or more participants. The simulations or games are managed so that participants of each team are prevented from having access to information which they are not expected or supposed to have in the context of a fair simulation or game.

A server runs a full simulation representing all information of the simulation or game according to a current simulation state and according to inputs generated by participants. In addition, the server generates a server partial simulation estimate for each team or for each participant. The server partial simulation estimates include information which is identical to client partial simulation estimates generated by the clients. However, the server partial simulation estimate is not generated based on all information of the full simulation. Accordingly, the server partial simulation estimates may lack information appropriate for the participants whose clients generate the corresponding client partial simulation estimates in the context of a fair simulation or game. In addition, the server partial estimates may include information inappropriate for the participants whose clients generate the corresponding client partial simulation estimates in the context of a fair simulation or game.

The server uses the information from the full simulation and from the server partial simulation estimates to generate correction patches to be transmitted to the clients. The correction patches include information for the clients to modify the client partial simulation estimates they generate. The correction patches may identify information to be added to the client partial simulation estimates. The correction patches may identify information to be removed from the client partial simulation estimates.

The correction patches are transmitted to the respective clients, and the clients generate client partial simulation estimates locally. The clients also modify the client partial simulation estimates based on the received correction patches, and present information corresponding to the modified client partial simulation estimates to the participants.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 702. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 706 or other servers over the network 704 or other networks.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a result listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processing system of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Figure 8:
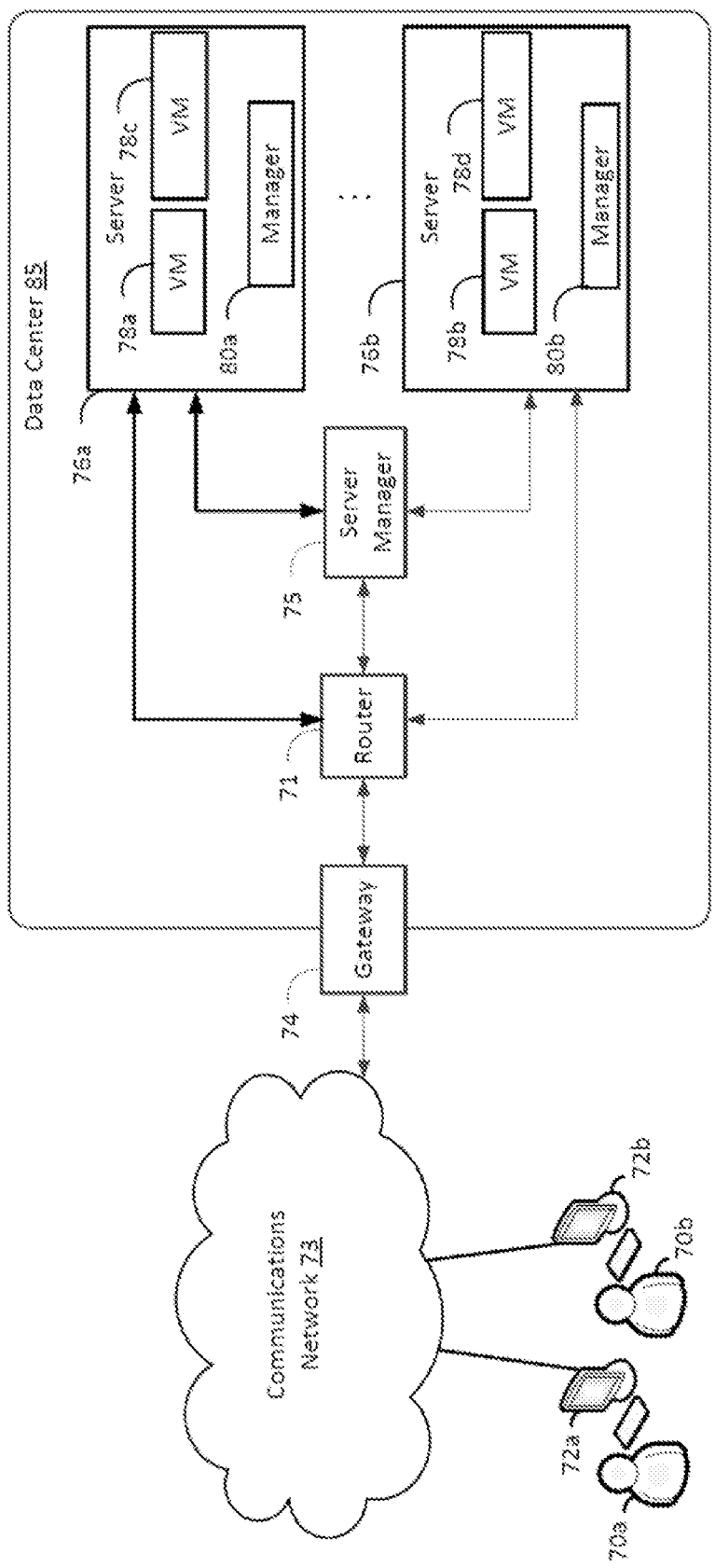
FIG. 8 illustrates an environment in which various embodiments can be implemented.

FIG. 8 illustrates an environment in which various embodiments can be implemented.

FIG. 8 is a diagram schematically illustrating an example of a data center 85 that can provide computing resources to users 70 *a* and 70 *b* (which may be referred herein singularly as user 70 or in the plural as users 70) via user computers 72 *a* and 72 *b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76 *a* and 76 *b* (which may be referred herein singularly as server 76 or in the plural as servers 76) that provide computing resources. These resources may be available as bare metal resources or as virtual machine instances 78 *a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72 *a* or 72 *b* may be a server, a desktop or laptop personal computer, a tablet computer, a wireless telephone, a personal digital assistant (PDA), an e-book reader, a game console, a set-top box or any other computing device capable of accessing data center 85. User computer 72 *a* or 72 *b* may connect directly to the Internet (e.g., via a cable modem or a Digital Subscriber Line (DSL)).

Although only two user computers 72 *a* and 72 *b* are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80 *a* or 80 *b* (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76 *a* and 76 *b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76 *a* and 76 *b*. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications.

Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of managing a simulation for a plurality of teams, each team having one or more participants, the method comprising:
   accessing, by a server computing device, first data representing:
      a full simulation state representing a state of an entire simulation;
      actions of the participants received as inputs; and
      full simulation instructions for the server computing device;
   executing, by the server computing device, the full simulation instructions, the full simulation instructions causing the server computing device to change the full simulation state according to the inputs;
   for each of the plurality of teams:
      identifying a particular team;
      generating, by the server computing device, a server partial simulation state estimate for the particular team; and
      generating, by the server computing device, a correction patch, the correction patch including information representing a difference between the server partial simulation state estimate for the particular team and a portion of the entire simulation which is to be accessible by a participant of the particular team;
   transmitting, by the server computing device, the correction patches to respective client computing devices of the participants; and
   transmitting, by the server computing device, one or more inputs to one or more of the respective client computing devices.

2. The computer-implemented method of claim 1, the correction patch identifying information of the entire simulation which is not included in the server partial simulation state estimate for the particular team, the identified information being allowed to be accessed by the participants of the particular team.

3. The computer-implemented method of claim 1, the correction patch identifying information of the server partial simulation state estimate for the particular team which would not be allowed to be accessed by the participants of the particular team.

4. The computer-implemented method of claim 1, further comprising:
   receiving, by a particular client computing device, one or more of the inputs transmitted by the server computing device;
   receiving, by the particular client computing device, one of the correction patches transmitted by the server computing device;
   generating, by the particular client computing device, a client partial simulation state estimate for the particular team, the client partial simulation state estimate for the particular team comprising information identical to information of the server partial simulation state estimate for the particular team;
   modifying, by the particular client computing device, the client partial simulation state estimate for the particular team based at least in part on the received correction patch;
   generating, by the particular client computing device, an output representing the modified client partial simulation state estimate for the particular team;
   receiving, by the particular client computing device, an input from a particular participant of the particular team; and
   transmitting, by the particular client computing device, the received input to the server computing device.

5. A server computing device, comprising:
   one or more server processors; and
   a server memory storing executable server instructions that, upon execution by the one or more server processors, cause the server computing device to execute operations to:
      for each of a series of simulation steps:
         run a full simulation representing a state of an entire simulation for a plurality of teams each having one or more participants; and
         for each particular team of the plurality of teams:
            identify a particular team;
            generate a correction patch for the identified particular team; and
            transmit the correction patch for the identified particular team to a client computing device of a participant of the identified particular team, the correction patch including information for modifying a simulation estimate to be generated by the client computing device.

6. The server computing device of claim 5, wherein the executable server instructions further cause the server computing device to execute operations to, for each particular team of the plurality of teams, generate a representation of the simulation estimate to be generated by the client computing device, the correction patch for each particular team being generated based at least in part on the representation and on the full simulation.

7. The server computing device of claim 5, the correction patches for the identified particular teams being generated based in part on a filtered full simulation.

8. The server computing device of claim 5, the correction patches for the identified particular teams being generated based in part on a filtered modified partial simulation estimate.

9. The server computing device of claim 5, the correction patches for the identified particular teams identifying information of the full simulation which is not included in respective partial simulation state estimates for the identified particular teams, the identified information being allowed to be accessed by the participants of the respective identified particular teams.

10. The server computing device of claim 5, the correction patches for the identified particular teams identifying information of a respective partial simulation state estimate for the identified particular teams which would not be allowed to be accessed by the participants of respective identified particular teams.

11. The server computing device of claim 5, the correction patches for the identified particular teams being generated before any of the correction patches are transmitted to client computing devices.

12. The server computing device of claim 5, a first correction patch being transmitted to a first client computing device before a second correction patch is generated.

13. A non-transitory computer-readable storage medium storing computer-executable instructions that, when executed by one or more processors of a computing device, cause the computing device to:
- run a full simulation representing a state of an entire simulation for a plurality of teams each having one or more participants; and
- for each particular team of the plurality of teams:
  - identify a particular team;
  - generate a server partial simulation state estimate for the particular team;
  - generate a correction patch, the correction patch including information representing a difference between the server partial simulation state estimate for the particular team and a portion of the entire simulation which is to be accessible by a participant of the particular team; and
  - transmit the correction patch for the particular team to a client computing device of a participant of the particular team.

14. The non-transitory computer-readable storage medium of claim 13, transmitting the correction patch for the identified particular team to the client computing device of the participant of the identified particular team comprising transmitting information of the full simulation, the information of the full simulation being limited to information which is allowed to be accessed by a participant of the identified particular team.

15. The non-transitory computer-readable storage medium of claim 13, the correction patches for the identified particular teams being generated based in part on a filtered full simulation.

16. The non-transitory computer-readable storage medium of claim 13, the correction patches for the identified particular teams being generated based in part on a filtered modified partial simulation estimate.

17. The non-transitory computer-readable storage medium of claim 13, each correction patch identifying information of the full simulation which is not included in a corresponding client partial simulation state estimate, the identified information being allowed to be accessed by the participants of a corresponding team.

18. The non-transitory computer-readable storage medium of claim 13, each correction patch identifying information of a corresponding client partial simulation state estimate which would not be allowed to be accessed by the participants of a corresponding team.

19. The non-transitory computer-readable storage medium of claim 13, the correction patches being generated before any of the correction patches are transmitted to client computing devices.

20. The non-transitory computer-readable storage medium of claim 13, a first correction patch being transmitted before a second correction patch is generated.

* * * * *